April 5, 1932.  L. KERN  1,852,709
HYDROGENATION OF CARBONACEOUS MATERIALS
Filed Oct. 5, 1922  2 Sheets-Sheet 2
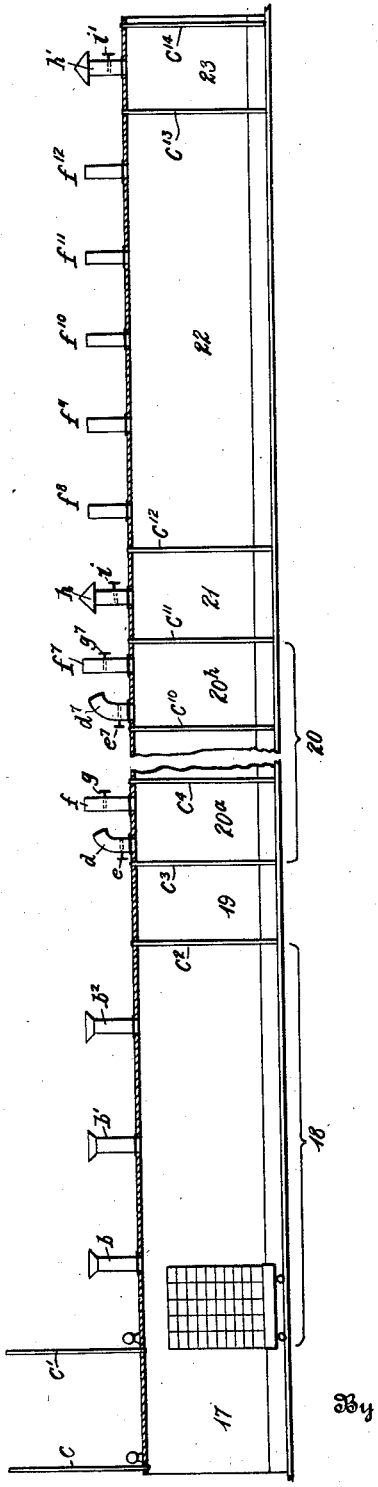
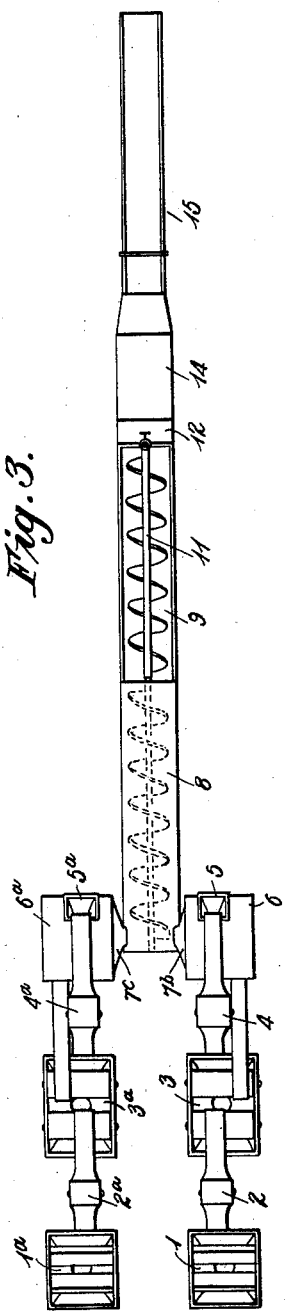
Inventor
Ludwig Kern
Attorney Patented Apr. 5, 1932

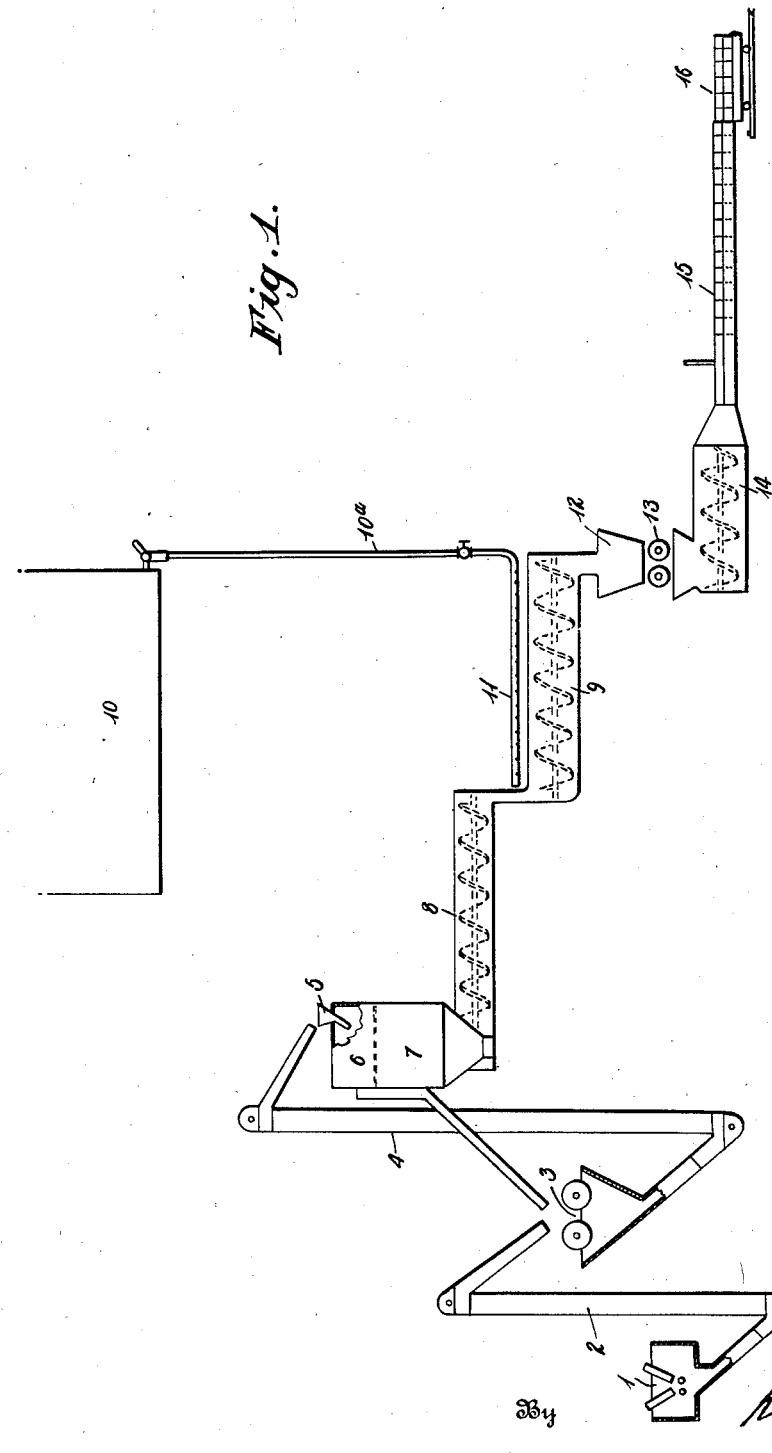

1,852,709

UNITED STATES PATENT OFFICE

LUDWIG KERN, OF WEBSTER GROVES, MISSOURI

HYDROGENATION OF CARBONACEOUS MATERIALS

Application filed October 5, 1922. Serial No. 592,638.

This invention relates to the recovery of hydrocarbons from bituminous or carbonaceous materials, and with regard to certain more specific features, to a generation and production of hydrocarbon products from materials heretofore considered incapable of yielding such products.

Among the several objects of the invention may be noted the provision of a process of the class described which includes a hydrogenation of carbonaceous or bituminous material under optimum conditions; a process of the class described which utilizes as catalysts only common substances readily obtainable, and which ultimately converts such catalysts into valuable by-products; a process of the class described wherein the hydrogenating agent used is in optimum contacting condition with the substance to be hydrogenated; a process of the class described wherein hydrogenation and liberation of the hydrogenated product is simultaneously effected; a process which includes hydrogenation not requiring costly media and conditions, such as high pressure and the like; a process for producing ceramic products of an exceptional porosity; a further process of utilizing such porous ceramic products in the recovery of hydrocarbons; the provision of a hydrocarbon product obtained from carbonaceous or bituminous substances; the provision of a highly porous inorganic product; and the provision of apparatus for carrying out the above-described processes under optimum conditions. Other objects will be in part obvious and in part pointed out hereinafter.

Briefly stated, my process comprises forming a mixture of finely-divided inorganic material, carbonaceous or bituminous material, and a hydrogenating agent into shaped objects wherein the particles are in intimate contact, and then subjecting such objects to distillation so as to drive off volatile constituents or hydrocarbons therein, and to leave behind a highly porous inorganic or ceramic object, which may be further utilized, and collecting and condensing the volatilized constituents evolved from said objects for subsequent use. Generally, said objects are subjected to a finishing operation, after the removal of the hydrocarbons, by heating them in the presence of air. In forming the objects, compression is desirable to insure intimacy of contact of the constituents. It may also be preferable to subject the objects to a preliminary heating operation prior to the distillation, in order to drive off such mechanically entrained water that may be present.

By the terms bituminous and carbonaceous materials herein I mean to include such non-gaseous carbonaceous substances as coal of various kinds, oil shale, fresh sea mud, slack turf, petroleum residues or residuums, sawdust, and like substances. Substances of this character will be referred to simply as "bituminous" or "carbonaceous" hereinafter.

Among the inorganic or earthy materials I have found suitable for use in my process are loam-meal, bauxite, infusorial silica, ground burnt lime, various clays, such as fire clay, zinc dust, various oxides, aluminum hydrosilicate and the like. For the lack of a more suitable generic term, these substances will be designated generally as "inorganic" or "earthy" materials hereinafter.

Hydrogen generating agents, or hydrogen carriers, herein to be designated by such names, include all non-gaseous substances capable of evolving hydrogen, preferably nascent, upon treatment as described hereinafter. For example, I may use hydrochloric acid, solutions of magnesium chloride, carnallite, sodium acid sulphate, caustic soda (when with an inorganic material such as zinc or aluminum dust), and the like.

In the operation of my process, the carbonaceous materials and the inorganic materials are first comminuted and mixed, and the hydrogenating agent is then added. The proportions involved vary with the character of the ingredients, and cannot be definitely stated. However, as examples of mixtures which I have found suitable, the following mixtures are given:

1. 370 kg. slack brown-coal containing 52 percent. water.
   240 kg. loam-meal.
   150 kg. solution of magnesium chloride, gravity 20° Bé. (hydrogen generating agent).
2. 100 kg. oil shale (carbonaceous and inorganic material).
   10 kg. bauxite.
   25 kg. solution of magnesium chloride, gravity 30° Bé. (hydrogen generating agent).
3. 100 kg. slack turf, containing 90 per cent of water.
   100 kg. mixture 50 kg. burnt lime and 50 kg. ground loam.
   30 kg. dehydrated, ground sodium acid sulphate.
4. 100 kg. Westphalian mineral coal containing 8 per cent. ashes.
   200 kg. mixture 180 kg. chamotte-clay and 20 kg. zinc dust.
   70 kg. solution of caustic soda, gravity 10° Bé.
5. 200 kg. petroleum residues or residuums.
   350 kg. mixture of 250 kg. ferric oxide and 100 kg. clay meal.
   400 kg. solution of magnesium chloride, gravity 30° Bé. (hydrogen generating agent).
6. 100 kg. ground sapropel coal.
   110 kg. mixture 50 kg. marsh lime meal ("Weisenkalkmehl"), 40 kg. ground loam, and 20 kg. ferric oxide.
   70 kg. solution of magnesium chloride, gravity 30° Bé. (hydrogen generating agent).
7. 300 kg. petroleum residues or residuums.
   100 kg. aluminum hydrosilicate (inorganic material).
   40 kg. crude hydrochloric acid, gravity 19–21° Bé.

The resulting mixture of carbonaceous material, earthy material, and hydrogenating agent is plastic or semi-plastic in nature. This mixture is next molded into shaped objects, which molding is preferably accomplished by machinery common to the brickmaking and allied ceramic arts. The molded objects are then loaded into a retort or distilling chamber to be described in detail hereinafter.

In the retort, the objects are subjected to heat treatment, preferably in three consecutive steps:

1. The water mechanically held in the objects is driven off.
2. The hydrocarbonaceous products are distilled from the objects.
3. The objects are hardened or finished.

The first step of driving off the mechanically held water is desirable, but not essential to the proper functioning of my process. For this step, the temperature of the retort need not rise much above 100° C.

In the second step, a chemical reaction probably takes place, whereby the carbonaceous material is hydrogenated by the hydrogenating agent, under the catalytic influence of the inorganic material, yielding as products hydrocarbonaceous substances which are distilled from the objects substantially as fast as they are formed. The mechanism of the reaction is indefinite, but it is probable that the inorganic material functions as a contact catalyst; first, in the primary or secondary decomposition of the hydrogen generating agent or hydrogen carrier into nascent or active hydrogen, and, second, in the chemical combination of such nascent hydrogen with the carbonaceous materials to form hydrocarbonaceous compounds. The activity of the inorganic material as a catalyst is greatly enhanced by its comminuted state, whereby it presents an extremely large surface for contact phenomena, and by its intimate contact with both carbonaceous and hydrogen generating substances.

Hydrogenation by means of chloride solutions, or salt solutions generally, may be explained as follows: The chloride solution, for example, the magnesium chloride solution referred to in Examples 1, 2, 5 and 6, hereinafter, hydrolyzes upon heating of the shaped objects to magnesium oxide or hydroxide and hydrochloric acid. Under the catalytic influence of the hot comminuted earthy material, the hydrochloric acid is decomposed into hydrogen and chlorine. The hydrogen thus liberated acts to hydrogenate the hydrocarbons and the carbonaceous material. The chlorine either combines directly with the hydrocarbons to form chlorinated hydrocarbons, such as chlorophenol and the like, or with the earthy material directly, or reacts with any water present to release further hydrogen and form hypochlorous acid, which is subsequently vaporized.

Acids and acid salts such as described in Examples 3 and 7, hydrogenate by direct decomposition to hydrogen anions and their respective cations. This decomposition is also probably catalyzed by the finely divided, heated inorganic or earthy or carbonaceous material.

The hydrogen-liberating qualities of a mixture of sodium hydroxide and zinc dust, as set forth in Example 4, are well known.

It is thus seen that various substances not ordinarily considered capable of generating hydrogen, are rendered so capable, by reason of their association with the active, finely divided, intimately contacting inorganic or earthy or carbonaceous material.

It is to be understood that the above is but a theory for the operation of my process; it may be that the mechanism is other than that pointed out, and at present unknown to me.

During the second step of the treatment in the retort, the temperature is preferably slowly increased, allowing the reaction to take place in a progressive manner, the lighter carbonaceous constituents first being hydrogenated, and passing off as vapors, and then the heavier constituents hydrogenated in the same manner. The temperatures necessary for the maximum production of hydrocarbons are determined by the natures of the carbonaceous materials and hydrogenating agents employed, and must be determined individually for each initial mixture. With certain mixtures, I have found it to be advantageous to bring the retort temperature to 1500° C. in a period of approximately twenty-four hours.

The continuous generating and distilling of hydrocarbons from the objects causes said objects to become highly porous in nature. Under certain circumstances it is desirable to maintain a suction within the retort, to aid in the expulsion of the hydrocarbon vapors from the objects, or to continually sweep the retort with steam. The porosity of the objects is presumably caused by the constant generation of hydrocarbon vapors therein and expulsion of such vapors therefrom.

The hydrocarbon vapors issuing from the retort are condensed in the usual manner. Noncondensible gases can be used for firing or heating the retort.

The third, or finishing, step in the retort is preferably accomplished by heating the distilled objects in the presence of a controlled stream of fresh air, thereby burning from the objects any combustible matter therein. The product obtained is highly porous, as described hereinbefore, and comprises substantially all inorganic material.

This porous object may be further utilized, either commercially in its present state, or in the procuring of further hydrocarbons in the following manners:

1. The porous object is soaked with a hydrogen generating agent, dried, and then further soaked with liquid or liquefied heavy hydrocarbons. The treated object is then subjected to a second distillation, whereby the hydrogen generating agent hydrogenates the heavy hydrocarbons, the porous inorganic object serving as a highly efficient contact catalyst. Light hydrocarbon vapors are obtained as products, and may be condensed or fractionated in the usual manner.

2. The porous object is soaked with a hydrogen generating agent as above and dried. Vapors of heavy hydrocarbons are then diffused through the impregnated object; these vapors are hydrogenated and may be collected and condensed in the customary manner.

3. The porous object is soaked with heavy hydrocarbons and then exposed to an atmosphere of hydrogen or other gas adapted to react with the object to produce hydrogen, whereby the hydrocarbon is effectively hydrogenated.

In each of the above methods, the porous object presumably acts as a catalyst of the contact variety; by reason of the high degree of porosity, it is possible to hydrogenate in this manner with the product.

In the accompanying drawings a plant is diagrammatically shown in which my processes of hydrogenating carbonaceous and bituminous substances and obtaining distillation products and by-products is preferably carried out.

Fig. 1 is a side view of the crushing, mixing and molding plant, partly in section, Fig. 2 is a longitudinal section of the multiple zone furnace, and Fig. 3 is a plan of the apparatus shown in Fig. 1.

Referring to Figs. 1 and 3, 1 is the preliminary crusher for the inorganic substance e. g., clay, and 1a is the preliminary crusher for the organic substance e. g., lignite. 2 is the bucket elevator, which carries the clay into the grinding machine 3 and 2a is the elevator carrying the lignite into the grinding machine 3a. 4 is the elevator which carries the ground clay into the hopper cup 5 of the sifter 6 and 4a is the elevator carrying the ground lignite into the hopper cone of the sifter 6a. Thereafter the sifted clay goes into the silo 7 of the measuring-tank 7b and the sifted lignite goes into the silo of the measuring-tank 7c. These devices for separately handling the clap and lignite in parallel courses are identical, only one series of devices (that which handles the clay) being shown in elevation in Fig. 1. The powdered clay and lignite will drop from the measuring-tank 7b and 7c into the dry mixing apparatus 8 and from there into the wet mixing apparatus 9, in which the dryly premixed material is homogenized with hydrochloric acid water issuing from tank 10 through the pipe 10a and flowing into the irrigation conduit 11. The pasty material drops then through the hopper 12 and the pair of rollers 13 into the clay cutter 14 which is provided with a mixing worm, and it proceeds therefrom as shaped objects on to the endless belt conveyance 15. From there the objects pass through an automatic accumulator 16 on to flat top cars by which the objects are carried into the combination distilling and roasting apparatus.

Fig. 2 is a longitudinal section of the multiple zone furnace which is lined with acid proof and refractory stone. 17 is the neutral chamber into which the cars carrying the objects are taken, the cars also being lined with acid-proof and refractory material and running on rails. This chamber serves for protecting the following zones against the entering of atmospheric air and is separated from the following zone, called drying zone 18, by the door $c_1$. In the smoking zone the shaped objects arriving from the neutral zone 17 are heated up to about 212° F. (100° Centigrade), after door $c_1$ has been closed, until a portion of the adhering water is evaporated. The evaporated water escapes at the top through the vapor outlet pipes $b$, $b_1$ and $b_2$ into the open air; exhausters not shown in Fig. 2 may be provided for facilitating the escape of the vapors.

The neutral chamber designated as 19, is separated from the drying zone as described above by a door $c_2$ and from the adjoining smoldering zone 20 by a door $c_3$. Both doors can be raised and lowered. Chamber 19 protects the adjoining zone 20 against the undesirable entrance of atmospheric air and at the same time serves as a passage for one group of cars or several groups passing from the smoking zone 18 into the smoldering zone 20, and it will also serve as a transitory residence for individual cars or for one or more groups of cars.

The smoldering zone designated as 20, is separated from the neutral chamber 19 as described above by the door $c_3$ and from the adjoining neutral chamber 21 by door $c_{11}$. After the door $c_{11}$ having been closed and doors $c_2$ and $c_3$ having been opened the objects are introduced into zone 20 whereafter the doors $c_2$ and $c_3$ are closed again. The objects are exposed to a temperature of upwards of 212°. F. (100° Centigrade) until the hydrating and distilling process as described above is fully or partly completed, the products of distillation escaping through the openings $d_1$—$d_7$ into pipes, not shown in the drawings, by which zone 20 is connected with the condensation plant not shown. Thereafter the openings for the escaping distillation products are closed again by means of valves $e_1$—$e_7$ and the chimneys $f$—$f_7$ arranged in connection with said openings are alternatively opened and closed by means of valves $g$—$g_7$ so that atmospheric air or mixture of atmospheric air and oxygen can be introduced into zone 20 in such quantities and at such intervals as required by the final products, and if also required the temperature may be raised for a short time. Zone 20 is furthermore connected with an exhauster or blower doing the work of the chimneys (not shown).

The neutral chamber designated as 21, is separated from the distillation and roasting zone 20 as described above by door $c_{11}$ and from the adjoining roasting zone by door $c_{12}$. After the chimneys in zone 20 have been closed or after stopping the blast the final products are carried into the neutral chamber 2 and the latter is then closed by the door $c_{13}$. By regulating the air admission or air escape flue $h$ by means of valve $i$ the final products can be slowly cooled. If required the final products may be taken out through doors not shown provided at these chambers and may be deposited or may be taken back to the point of issue on rails arranged along the plant.

It is however advisable in general to carry the final products directly into the roasting zone 22 after the air flue $h_1$ has been closed and door $c_{12}$ has been raised, the roasting zone being shut off at its end by door $c_{13}$. The roasting zone 22 is of the same kind as zone 20 and is provided with chimneys $f_8$—$f_{12}$ but it has no means for distilling. In the zone 22 the final products are refined.

The following is a description of the inner construction of zone 20. It is made of such a length as to allow arranging divisional zones say about 8 in number having temperatures of 212°–2732° F. (100°–1500° C.) by lowering the doors $c_3$ and $c_{11}$, zone 20$a$ being of a temperature of 212–482° F. (100–250° C.) zone 20$b$ of 482°–572° F. (250–300° C.) zone 20$c$ of 572°–662° F. (300–350° C.) zone 20$d$ of 662°–752° F. (350°–400° C.) zone 20$e$ of 752°–842° F. (400°–450° C.) zone 20$f$ of 842°–932° F. (450°–500° C.) zone 20$g$ of 1022°–1832° F. (550–1000° C.) and zone 20$h$ of 1832°–2732° F. (1000–1500° C.). For the purpose of economizing space in the drawings, the intermediate zones are omitted.

The oils thus obtained which are of great sensitiveness with regard to the change of temperature are removed separately and are obtained by fractional distillation.

It is possible to subject the shaped objects to temperatures gradually increasing by zones or to subject them to a treatment within one common room in which latter case the doors $c_3$—$c_{11}$ must be raised. The temperature required in the apparatus may be raised gradually in the common room or in order to do away with separate zones it may be gradually raised by indirectly heating the heating walls of the subsequent zones. Zone 20 and each subzone attached to it is provided with the respective means for introducing water vapor or indifferent gases. The cars may be likewise provided with such means.

According to the above description each zone constitutes a self contained retort, retort 18 serving for drying the raw shaped objects, retort 20, including retorts 20$a$—20$h$, respectively serving for dehydrating and distilling the objects and retort 22 serving for refining the final products. The retorts are also in connection with the neutral chambers 19, 21 and 23 which serve for excluding air, partly for cooling and as passages for individual cars, individual groups of cars or several groups of cars. The process may be retarded or interrupted by means of these chambers.

In working the plant as described above a single group of cars may be set into operation or several groups of cars may be sent continuously through the zones and neutral chambers.

The apparatus is preferably heated as in the case of coke ovens by its own gas, the latter flowing into burner pipes arranged below the furnaces in nozzle channels and is therefrom conducted into flues after air has been introduced from sideways, said flues equally distributing the gas within the heating walls. The heating walls radiate the heat equally towards the material within the zones or retorts. In the case of electric current obtainable at low rates the apparatus may be electrically heated and the gas may be used for generating power or for other purposes.

Regenerators or recuperators may be used in addition for pretreating the air for combustion, or gases of low calorific effect which might be used. Arrangements may be made to heat the apparatus by generator gas and to make use of the waste gases and the waste heat generated during the process.

In view of the above, it will be seen that the several objects of the invention are achieved and other advantageous results obtained.

As many changes could be made in carrying out the above processes and constructions without departing from the scope of the invention, it is intended that all matter contained in the above descriptions or shown in the accompanying drawings shall be interpreted as illustrative and not in a limiting sense.

I claim:

1. The process of forming hydrocarbons comprising intimately mixing a distillable carbonaceous material, a solid earthy material, and a hydrogenating agent of a class including liquids and solids, to form a plastic mass, forming said mass into objects, and subjecting said objects to distillation whereby said hydrogenating agent is activated to hydrogenate said carbonaceous material.

2. The process of forming hydrocarbons comprising intimately mixing a distillable carbonaceous material, solid earthy material, and a hydrogenating agent of a class including liquids and solids, to form a plastic mass, forming said plastic mass into shaped objects, subjecting said objects to a preliminary heating operation at a temperature of the order of 100° C., thereby drying said objects and subjecting said dried objects to distillation at progressively higher temperatures, the final temperature being of the order of 1500° C., thereby first activating said hydrogenating agent to hydrogenate said carbonaceous material, and finally burning residual carbonaceous material from said objects.

3. The process of forming hydrocarbons comprising intimately mixing comminuted coal, solid earthy catalytic material, and a hydrogenating agent of a class including liquids and solids to form a plastic mass, molding said mass into shaped objects, and subjecting said shaped objects to distillation, whereby said hydrogenating agent is activated to hydrogenate said coal.

4. The process of forming hydrocarbons comprising intimately mixing comminuted coal, clay, and a hydrogenating agent of a class including liquids and solids to form a plastic mass, molding said mass into shaped objects, and subjecting said objects to distillation, whereby said hydrogenating agent is activated to hydrogenate said coal.

5. The process of forming hydrocarbons comprising intimately mixing comminuted coal, clay, and a chloride to form a plastic mass, molding said mass into shaped objects, and subjecting said objects to distillation, whereby said chloride is activated to hydrogenate said coal.

6. The process of making highly porous objects which comprises intimately mixing a distillable carbonaceous material, a solid earthy material, and a hydrogenating agent of a class including liquids and solids to form a plastic mass, compressing said mass into shaped objects, and subjecting said shaped objects to distillation, whereby said hydrogenating agent acts upon said carbonaceous material to form hydrogenated hydrocarbons which are volatilized, and subjecting said shaped objects after said distillation to heat and a current of oxidizing gas.

7. The process of making highly porous objects which comprises intimately mixing a distillable carbonaceous material, solid earthy material, and a hydrogenating agent of a class including liquids and solids to form a plastic mass, compressing said mass into shaped objects, and subjecting said shaped objects to distillation, whereby said hydrogenating agent acts upon said carbonaceous material to form hydrogenated hydrocarbons which are volatilized, and hardening and finishing said distilled shaped objects, said hardening and finishing operation comprising heating said shaped objects in a current of air, for a duration and at a temperature sufficient to consume substantially all of the residual carbonaceous material.

In testimony whereof the foregoing specification is signed.

LUDWIG KERN.